US012801925B2

(12) United States Patent
Saxena et al.

(10) Patent No.: US 12,801,925 B2
(45) Date of Patent: Nov. 17, 2026

(54) AUTOMATIC MEMORY MANAGEMENT FOR COMPUTE GRAPHS

(71) Applicant: Google LLC, Mountain View, CA (US)

(72) Inventors: Ashish Saxena, Ilford (GB); Vinsensius B. Vega S. Naryanto, Zurich (CH); Matej Rizman, London (GB); Pavel Shmakov, London (GB); Juan Antonio Navarro Perez, London (GB); Cyril Chimisov, London (GB)

(73) Assignee: Google LLC, Mountain View, CA (US)

( * ) Notice: Subject to any disclaimer, the term of this patent is extended or adjusted under 35 U.S.C. 154(b) by 993 days.

(21) Appl. No.: 18/063,804

(22) Filed: Dec. 9, 2022

(65) Prior Publication Data

US 2024/0193421 A1 Jun. 13, 2024

(51) Int. Cl.
*G06N 3/084* (2023.01)

(52) U.S. Cl.
CPC .................................... *G06N 3/084* (2013.01)

(58) Field of Classification Search
CPC ...................................................... G06N 3/084
See application file for complete search history.

(56) References Cited

U.S. PATENT DOCUMENTS

2021/0295161 A1 9/2021 Yu et al.
2024/0168915 A1* 5/2024 Du ......................... G06N 3/063

OTHER PUBLICATIONS

Nie et al. "TSPLIT: Fine-grained GPU Memory Management for Efficient DNN Training via Tensor Splitting", ICDE, Aug. 2022, pp. 2615-2628.*
Artem Artemev et al: "Memory Safe Computations with XLA Compiler", arxiv.org, Cornell University Library, 201 Olin Library Cornell University Ithaca, NY 14853. Jun. 28, 2022 (Jun. 28, 2022), XP091258929.
International Search Report and Written Opinion issued in related PCT Application No. PCT/US2023/083229, dated Mar. 13, 2024.
Zia et al: Optimizing DNN Computation with Relaxed Graph Substitutions, <https://cs.stanford.edu/%7Ematei/papers/2019/sysml_relaxed_graph_substitutions.pdf>, Published 2019.

(Continued)

*Primary Examiner* — Miranda M Huang

(74) *Attorney, Agent, or Firm* — Shumaker & Sieffert, P.A.

(57) ABSTRACT

A method includes obtaining a compute graph for computing a first tensor, identifying in the graph a reduction operation in at least one dimension of the first tensor, locating, at the operation, a cut point that cuts the graph into first and second portions, and determining a plurality of slices of the first tensor. The method also includes backpropagating the cut point through the graph to define a plurality of first graph pieces for the first portion, each particular first graph piece representing a computation of a particular slice of the plurality of slices based on a particular portion of a plurality of portions of a second tensor. The method further includes defining one or more second graph pieces to combine outputs of the first graph pieces, and executing the first graph pieces and the second graph pieces to execute the first portion of the compute graph.

20 Claims, 6 Drawing Sheets

(56) References Cited

OTHER PUBLICATIONS

Qararyaha et al: A Computational-Graph Partitioning Method for Training Memory-Constrained DNNs, <https://www.semanticscholar.org/paper/A-Computational-Graph-Partitioning-Method-for-DNNs-Qararyah-Wahlb/32f01b6cceb485937a87799383cd1d80aee8219f>, published Aug. 19, 2022.
Tf.Slice, https://www.tensorflow.org/api_docs/python/tf/slice <https://www.tensorflow.org/api_docs/python/tf/slice>, TensorFlow, published Sep. 15, 2022.

* cited by examiner

200

```
@tf.function(input_signature=[
      tf.TensorSpec([], dtype=tf.int32, name='a'),
      tf.TensorSpec([None, None], dtype=tf.float64, name='foos'),
      tf.TensorSpec([None], dtype=tf.float64, name='bars')
])
def example(a, foos, bars):
      """Example TensorFlow calculation.

      Args:
            a: A scalar integer tensor.
            foos: A matrix tensor of shape [b, c].
            bars: A vector tensor of shape [b].

      Returns:
            A scalar floating point number.
"""

c = tf.shape(foos)[-1]

# Get a matrix of shape [a, c] with random numbers.
m = tf.random.stateless_normal([a, c],
                                 seed=[0, 0],
                                 dtype=tf.float64,
                                 name='m')
# Do some matrix operations to compute the tensor `x = m @ foos.T + bars`
# of shape [a, b], compute the mean along the last axis, i.e.
# `y = tf.reduce_mean(x, axis=-1)`, then square the resulting values, i.e.
# `baz = y^2` of shape [a].
baz = tf.math.square(
      tf.reduce_mean(tf.matmul(m, tf.transpose(foos)) + bars, axis=-1),
      name='baz')

# Finally sum all of those numbers, resulting in a single scalar floating
# point number, and compute its square root.
return tf.math.sqrt(tf.reduce_sum(baz), name='output')
```

FIG. 2

400

```
@tf.function
def fun1(index, foos, bars):
      """First piece function."""
      c = tf.shape(foos)[-1]

      strip_size = 500 # Statically determined when choosing the cut.
      strip_begin = index * strip_size

      # Seed chosen to "skip forward" to the relevant output slice.
      # Illustrative formula.
      seed = [strip_begin * c // 4, 0]

      m = tf.random.stateless_normal([strip_size, c],
                                     seed=seed,
                                     dtype=tf.float64,
                                     name='m')
      baz = tf.math.square(
            tf.reduce_mean(tf.matmul(m, tf.transpose(foos)) + bars, axis=-1),
            name='baz')
      return baz



@tf.function
def fun2(input_strips):
      """Second piece function."""
      return tf.sqrt(tf.reduce_sum(input_strips, axis=0), name='output')
```

FIG. 4

AUTOMATIC MEMORY MANAGEMENT FOR COMPUTE GRAPHS

TECHNICAL FIELD

This disclosure relates to compute graphs.

BACKGROUND

It is increasingly common for businesses and other entities to have need to perform large numbers of computations on large quantities of data. Compute graphs can be used to define and execute such computations. For example, many deep learning frameworks rely on compute graphs to perform backpropagation during training of machine learning models, and compute graphs have been used to assess the risk and valuation of financial derivatives. Example languages that may be used to construct/define compute graphs include, but are not limited to, TensorFlow, Torch, Python, Berkely Caffe, Apache MXNet, Microsoft CNTK, Java, and Theano.

SUMMARY

One aspect of the disclosure provides a computer-implemented method executed by data processing hardware that causes the data processing hardware to perform operations. The operations include obtaining a compute graph for computing a result based on a first tensor. The compute graph includes a plurality of nodes and each node represents a computation operation connected to one or more other nodes via edges. Each edge represents a computational dependency between two connected nodes. The operations include identifying, from the plurality of nodes, a reduction operation in at least one dimension of the first tensor. The operations also include cutting, at the identified reduction operation in the compute graph, the compute graph into a first portion and a second portion and determining, based on the identified reduction operation, a plurality of slices of the first tensor. The operations include defining, using backpropagation from the identified reduction operation, a plurality of first graph pieces for the first portion of the compute graph. Each first graph piece of the plurality of first graph pieces represent a computation of a respective slice of the plurality of slices of the first tensor based on a particular portion of a plurality of portions of a second tensor and defining one or more second graph pieces to combine outputs of the plurality of first graph pieces. The operations also include executing the plurality of first graph pieces and the one or more second graph pieces to compute the first tensor. After executing the first portion of the compute graph, the operations include executing the second portion of the compute graph, using the first tensor, to compute the result.

Implementations of the disclosure may include one or more of the following optional features. In some implementations, the plurality of first graph pieces and the one or more second graph pieces, when executed by a computing resource, require an amount of memory that does not exceed an amount of memory available to the computing resource. In some of these implementations, the compute graph, when executed by the computing resource prior to cutting the compute graph, requires an amount of memory that exceeds the amount of memory available to the computing resource. In some examples executing, using a computing resource, the plurality of first graph pieces and the one or more second graph pieces reduces an amount of memory needed by the computing resource relative to executing, using the computing resource, the compute graph.

The operations may further include tracking a size of the first tensor based on one or more symbolically named dimensions. The operations may even further include determining an upper bound for the size of the first tensor based on upper bounds for the symbolically named dimensions. Optionally, the operations further include identifying the reduction operation based on the size of the first tensor and an amount of memory available in a computing process instance.

In some implementations, one or more of the plurality of first graph pieces are executed in serial. Two or more of the plurality of first graph pieces may be executed in parallel. Two or more of the plurality of first graph pieces, in some examples, are executed on virtual computing resources.

Another aspect of the disclosure provides a system for performing large-scale computations using a compute graph. The system includes data processing hardware and memory hardware in communication with the data processing hardware. The memory hardware stores instructions that when executed on the data processing hardware cause the data processing hardware to perform operations. The operations include obtaining a compute graph for computing a result based on a first tensor. The compute graph includes a plurality of nodes and each node represents a computation operation connected to one or more other nodes via edges. Each edge represents a computational dependency between two connected nodes. The operations include identifying, from the plurality of nodes, a reduction operation in at least one dimension of the first tensor. The operations also include cutting, at the identified reduction operation in the compute graph, the compute graph into a first portion and a second portion and determining, based on the identified reduction operation, a plurality of slices of the first tensor. The operations include defining, using backpropagation from the identified reduction operation, a plurality of first graph pieces for the first portion of the compute graph. Each first graph piece of the plurality of first graph pieces represent a computation of a respective slice of the plurality of slices of the first tensor based on a particular portion of a plurality of portions of a second tensor and defining one or more second graph pieces to combine outputs of the plurality of first graph pieces. The operations also include executing the plurality of first graph pieces and the one or more second graph pieces to compute the first tensor. After executing the first portion of the compute graph, the operations include executing the second portion of the compute graph, using the first tensor, to compute the result.

Implementations of the disclosure may include one or more of the following optional features. In some implementations, the plurality of first graph pieces and the one or more second graph pieces, when executed by a computing resource, require an amount of memory that does not exceed an amount of memory available to the computing resource. In some of these implementations, the compute graph, when executed by the computing resource prior to cutting the compute graph, requires an amount of memory that exceeds the amount of memory available to the computing resource. In some examples executing, using a computing resource, the plurality of first graph pieces and the one or more second graph pieces reduces an amount of memory needed by the computing resource relative to executing, using the computing resource, the compute graph.

The operations may further include tracking a size of the first tensor based on one or more symbolically named dimensions. The operations may even further include determining an upper bound for the size of the first tensor based on upper bounds for the symbolically named dimensions. Optionally, the operations further include identifying the reduction operation based on the size of the first tensor and an amount of memory available in a computing process instance.

In some implementations, one or more of the plurality of first graph pieces are executed in serial. Two or more of the plurality of first graph pieces may be executed in parallel. Two or more of the plurality of first graph pieces, in some examples, are executed on virtual computing resources.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2 is an example compute graph expressed in TensorFlow code.

FIG. 4 is TensorFlow code for example graph pieces for the compute graph of FIG. 2.

Like reference symbols in the various drawings indicate like elements.

DETAILED DESCRIPTION

Figure 1:
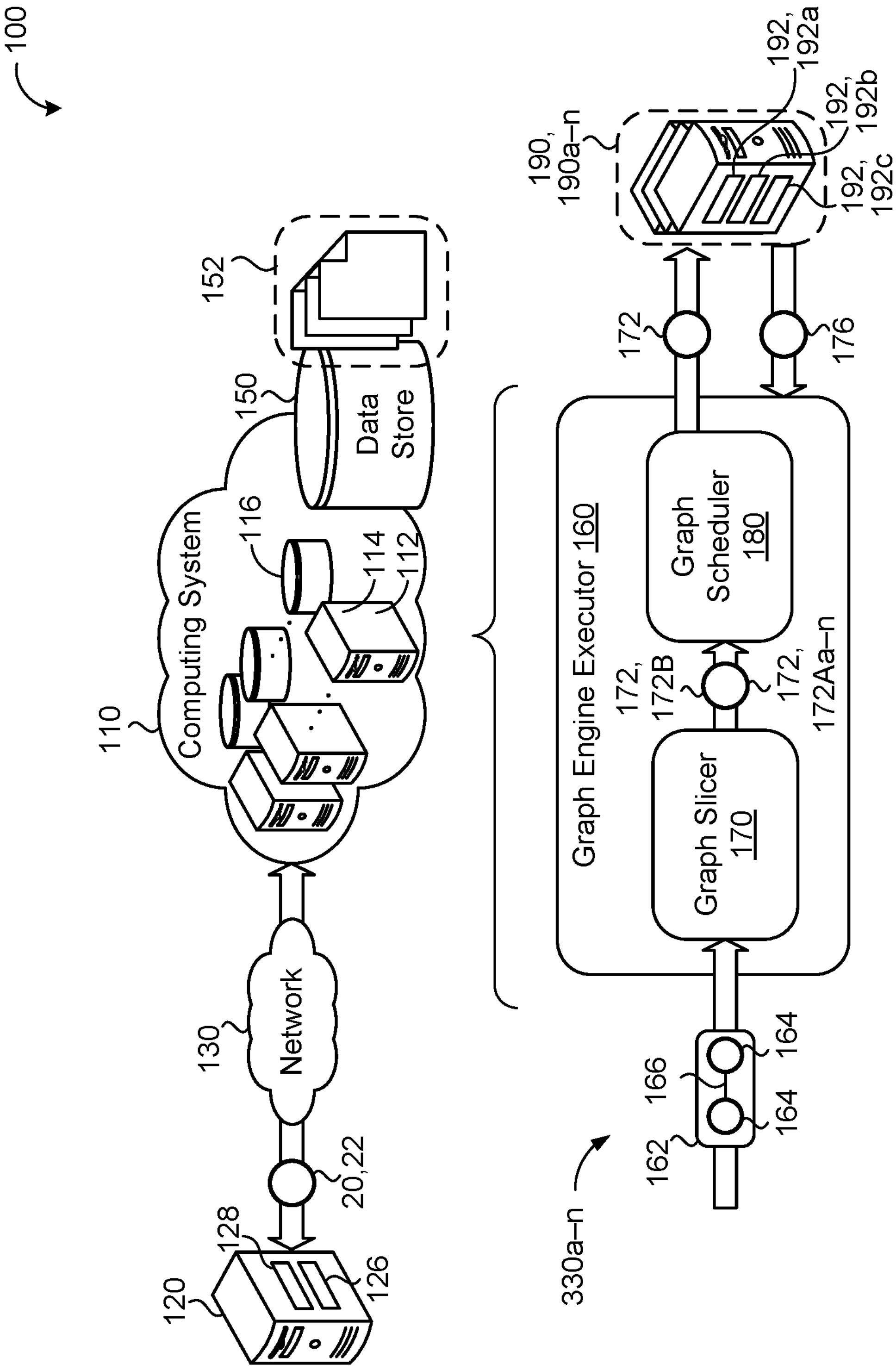
FIG. 1 is a schematic view of an example system for performing memory management for compute graphs.

In general, compute graphs (also referred to herein as graphs) are directed graphs that include nodes and edges that represent computations that compute one or more tensors. Here, each node represents one or more computations and is connected to one or more other nodes via edges, and each edge represents a computational dependency between two connected nodes. As used herein, "computing" and "computations" may refer to any number and/or type(s) of operations including, but not limited to, mathematical, linear algebra, logical, filtering, input, output, and/or data selection operations. Moreover, as used herein, "tensor" may refer to any type of data storage element or multidimensional array (e.g., scalar, vector, matrix, array, tuple, etc.) having any number and/or type(s) of data elements (e.g., numerical, logical, classification, etc.).

Compute graphs may be used to define and execute large numbers of computations, and/or computations on large amounts of data. However, some compute graphs require an excessively large amount of data (e.g., tebibytes (TiB)) during their computation. In some instances, the amount of data needed to execute a compute graph exceeds the finite amount of memory/storage resources available to a computing resource for executing a compute graph piece. While garbage collection may be used to discard already used and no longer needed data, garbage collection is not applicable when a large amount of data is required at a particular time such that none of the data can be discarded. Moreover, while virtual memory (VM) may be used to expand available memory resources, VM simply trades off one type of storage (e.g., random access memory (RAM)) for another type of storage (e.g., a disk drive), but does not reduce the needed amount of memory to compute a compute graph.

Disclosed implementations provide memory management for compute graphs such that the need for large amounts of data to execute a compute graph can be obviated. Disclosed implementations rewrite an original compute graph as an equivalent set of compute graph pieces (also referred to herein as simply graph pieces). For example, by replacing one or more operations acting on large amounts of data with repeated execution of a similar collection of operations (e.g., graph pieces) acting on smaller slices of the same data. In this way, disclosed examples support compute graphs having large data sets that do not fit within the memory of a single computing resource. That is, by expressing the original compute graph as a set of compute graph pieces that can be executed serially, memory constraints imposed by conventional computing resources may be overcome. Results of the graph pieces are subsequently combined together to obtain a result of the original compute graph. Notably, the graph pieces, when executed according to a prescribed execution plan, and when the original compute graph is stateless, produce the exact same results as the original compute. Alternatively, the graph pieces, when the original graph is not stateless, and when executed according to a prescribed execution plan, may produce results that are statistically similar to results produced by the original compute graph.

The compute graph pieces are defined such that their data storage requirements are maintained below a pre-determined threshold that represents the amount of memory available to a computing resource for computing a compute graph piece. However, different computing resources may be used to execute different graph pieces, such that the compute graph pieces need to comply with the same memory constraints. The graph pieces may be executed serially by one or more physical and/or virtual computing resources (e.g., a physical computing device, a physical computing server, a virtual cloud-based computing resource, etc.) with limited memory resources. The graph pieces may also be executed in parallel by two or more computing resources. In some examples, smaller memory requirements are traded off with execution time.

While examples will be described herein using TensorFlow, persons of ordinary skill in the art will readily appreciate that disclosed embodiments can be used to perform memory management for compute graphs written in other languages, such as, but not limited to, Torch, Python, Berkely Caffe, Apache MXNet, Microsoft CNTK, Java, and Theano.

FIG. 1 is a schematic view of an example large-scale computation system 100 that includes a computing system 110 in communication with one or more computing devices 120 via a network 130. The computing system 110 may be, but is not limited to, a single computer, multiple computers, a distributed system (e.g., a cloud environment) having scalable/elastic resources 112 including computing resources 114 (e.g., data processing hardware) and/or storage resources 116 (e.g., memory hardware). A data store 150 (i.e., a remote storage device) may be overlain on the storage resources 116 to allow scalable use of the storage resources 116 by one or more of the clients (e.g., the computing device 120) or the computing resources 114. In some examples, the computing system 110 is instead an on-premises computing device or any other public, private, or hybrid cloud environment.

The computing system 110 receives a computation request 20 to execute a compute graph 162 from, for example, the computing device 120 via the network 130. The computing device 120 may correspond to any computing device, such as a server, a desktop workstation, a laptop workstation, or a mobile device (i.e., a smart phone). The computing device 120 includes computing resources 126 (e.g., data processing hardware) and/or storage resources 128 (e.g., memory hardware). The computing request 20 requests the computing system 110 to perform multiple computations to determine, in some implementations, a result 22 of the compute graph 162. For example, the computing device 120 may be associated with a financial institution and the computing request 20 may request the computing system 110 to determine a total value and/or risk of a portfolio of thousands or millions of financial instruments. The value of these instruments may be dependent on a large number of variables (e.g., time factors, interest rates, market sentiment, etc.). In other examples, the request is to perform other applications, such as training of a machine learning model, large-scale Markov chains, Monte Carlo methods, and/or fluid dynamics.

The computing system 110 executes a graph engine executor 160. The graph engine executor 160 obtains a compute graph 162 that includes multiple nodes 164. Each node 164 is connected to one or more other nodes 164 via edges 166 that represent computational dependencies between the connected nodes 164. For example, when a computational job represented by a first node 164 requires an output of a second computational job represented by a second node 164, the first node 164 and the second node 164 are connected by an edge 166. The compute graph 162 represents the computations requested by the computation request 20. The graph engine executor 160 may obtain the compute graph 162 from another source (e.g., from the computing device 10). Alternatively, the graph engine executor 160 generates the compute graph 162 via a graph generating module (not shown) such as a graph processor or graph optimizer from data 152 stored at a data store 150 and/or received from the computing device 120. The graph engine executor 160 may generate the compute graph 162 in response to the request 20. Alternatively the graph engine executor 160 retrieves the compute graph 162 in response to the request 20. Alternatively, the request 20 includes the compute graph 162.

The graph engine executor 160 executes a graph slicer 170. The graph slicer 170 receives the original compute graph 162 and automatically analyzes and rewrites calculations of the compute graph 162 into multiple graph pieces 172, 172*a-n* (also referred to herein as simply pieces 172). The graph slicer 170 trades off memory requirements and execution time or, if parallelizing across a cluster of machines, a number of machines with fewer resources each. The graph slicer 170 analyzes a possibly "thick" graph 162 (e.g., involving intermediate nodes with large tensors 330, 330*a-n* that require significant computational resources) and breaks the graph 162 into one or more "slim" graph pieces 172, which may be executed under a constrained amount of available memory resources available to a computing resource. The graph pieces 172 compute intermediate results (e.g., tensors) which may be fed to other graph pieces 172 and, finally, aggregated together to reproduce the same or statistically similar results to those that would be produced by the original compute graph 162.

The graph slicer 170 statically analyzes the compute graph 162 to determine the sizes of all the tensors 330 (e.g., in mebibytes (MiB)) that the compute graph 162 contains, as well as the relationship between input/output dimensions for each computation operation in the compute graph 162. The graph slicer 170 may use dynamic shapes, which are shapes based on named symbolic dimensions, to track the identities and dimensions of the tensors 330 as the tensors 330 flow through and change during graph computations. Additionally, the graph slicer 170 may compute upper bounds for the size of all tensors 330 in the compute graph 162 based on upper bounds on the sizes of each dimension.

Tensors 330 have a shape that represents the number of elements it contains along several possible dimensions. A shape is usually denoted by a tuple $(d_0, \ldots, d_{k-1})$ where k is the rank of the tensor (the number of dimensions), and di is the size of the tensor on axis i. The total number of elements in a tensor is thus $d_0 \times \ldots \times d_{k-1}$ and its size in bytes is the number of elements in the tensor multiplied by the size of each element (e.g., as given by the tensor's data type, dtype). TensorFlow allows the use of dynamic dimensions, leaving some of the di unspecified (e.g., set to None), indicating that the size of the dimension is not known at graph construction time, but may be later inferred during graph evaluation. In some examples, the graph slicer 170 gives names to the dimensions of input tensors 330, so the graph slicer 170 may track the dimensions as they flow throughout a compute graph 162. As used herein, symbolic shapes are shapes made up of symbolic dimensions, and symbolic values are Tensor-like objects of a symbolic shape. A symbolic value may be similar to a tf. TensorSpec, but with support of symbolic shapes and, optionally, with information about its symbolic data contents. Symbolic dimensions may, moreover, be composed using basic arithmetic operators (e.g., addition, subtraction, multiplication, division, and integer division) into symbolic expressions. For example n−1 describes the size of one dimension in terms of another one.

The graph slicer 170 propagates such shape and dtype information between the inputs and outputs of a compute graph 162, which is referred to herein as shape inference. For example, if x and y have been determined to hold shapes (a, b) and (b, c), respectively, then the graph slicer 170 may determine or infer the shape of z=tf.linalg.matmul(x,y) to be (a,c). In this example, the dimension z.shape[0]=x.shape[0] and the dimension z.shape[1]=y.shape[1] while dimensions x.shape[1] and y.shape[0] are reduced and no longer appear at the output. For some computational operations, the graph slicer 170 may create new symbolically named dimensions during shape inference. For example, if cond is a tensor with a shape (a,b), the graph slicer 170 may infer the shape of tf.where(cond) to be (c,2), where c is a new symbolically named dimension satisfying c.max_size==a.max_size*b.max_size. The graph slicer 170 performs shape inference for each computation operation using override methods to infer their shape, dtype, and (optionally) contents. Here, if max_size is provided for all dynamic input dimensions, the graph slicer 170 may infer the shape of a tensor 330 to be an upper bound for the number of elements that the tensor 330 may hold at runtime. Together with the tensor's dtype, the graph slicer 170 can determine an upper bound for the size in bytes of the actual tensor data.

The graph slicer 170 then uses the named symbolic dimensions to identify one or more cut-point operations (also referred to herein as cut-point ops) of the compute graph 162. That is, the graph slicer 170 determines one more computations of the compute graph 162 (also referred to herein as operations) where the compute graph 162 can be split into the multiple separate graph pieces 172. In general, a cut may be a simple object with four properties: (i) axis which is the fixed axis along which the cut is applied, (ii) begin which a symbolic expression indicating the beginning of the slice, (iii) size which a symbolic expression indicating the size of the slice, and (iv) cut mode. Example cut modes include (a) slice data mode where a tensor is sliced along an axis, (b) update shape mode where the shape of a tensor is changed by the replacing the size of an axis, (c) offset counter mode where the counter for a random generator is offset, and (d) no cut mode where the original tensor or attribute is kept unchanged. A value strip is a cut tied to a particular symbolic or attribute value. In some examples, the graph slicer 170 places these cut-points at graph operations where the dimension of an input is reduced (i.e., a reduction operation) and no longer appears in its output (e.g., as in tf.reduce_sum). If the reduced dimension is large, the graph slicer 170 may cut the dimension by building a graph piece 172 to compute smaller strips of the tensor 330, rather than all of it at once. The graph slicer 170 replaces the cut-point operation of the compute graph 162 with a process that separately computes multiple input slices by repeatedly executing a graph piece 172, and then aggregating the multiple input slices together to recover the original intended output.

In particular, once the graph slicer 170 performs shape inference on the full compute graph, the graph slicer 170 analyzes the resulting set of shapes and dimensions to determine, based on data type(s) and size(s), an upper bound for the expected amount of memory needed to hold the data of every individual tensor 330 in the compute graph 162. The graph slicer 170 then selects some dimensions and tensors 330 to cut into smaller strips, trying to make sure that their size is small enough to fit within the memory resources expected to be available at runtime. For example, the graph slicer 170 may choose dimensions and strip sizes that guarantee that the size of all created tensor strips is within some predefined threshold. Here, the graph slicer 170 may choose based on factors such, but not limited to, as: a preference for placing cuts on potentially large dimensions, a preference to place cuts on left-most dimensions (as these are typically batch dimensions), and/or a preference to choose cut-point ops that those closest to the outputs and where such a large dimension is reduced. Additionally or alternatively, the graph slicer 170 may choose dimensions and sizes such that: final output strips produced by a graph piece 172 remain under a predetermined threshold (e.g., 512 MiB) to ensure that strips can be conveniently stored and transferred over the network when needed, strip sizes are divisible by 4 to facilitate cutting through random ops, and/or strip sizes are powers of 2 to enable padding in an accelerated linear algebra (XLA) friendly manner for better utilization of a graphics processing unit (GPU) and/or a tensor processing unit (TPU).

Notably, even if the graph slicer 170 ensures that each individual tensor 330 fits within the available amount of memory, this might not be enough to ensure that a computation will not run out of memory due to, for example, one or more internal or intermediate results that must be simultaneously held in memory at once. Thus, the graph slicer 170 seeks to ensure that all resulting tensor strips are small and that the peak memory required by, for example, the TensorFlow runtime to complete all the required computations is strictly less than the memory resources available to the runtime. Notably, peak memory may depend on the implementation details of the TensorFlow runtime such as the order in which operations are executed and how aggressively memory is being garbage collected. Accordingly, the graph slicer 170 may determine an estimate of peak memory usage by, for example, determining a lower bound based on a given topological sort order for the computations in the compute graph 162 and assuming memory is aggressively freed after the value of a tensor 330 is no longer needed for the rest of the computations. Note, however, that different topological sort orders could lead to different peak usage estimates. From such an estimate of memory usage, the graph slicer 170 may place cuts on dimensions such that, at least for a hypothetical execution strategy, the peak usage remains under a specified threshold.

Some graph computations behave as reducers (e.g., tf.reduce_*, tf.matmul, and tf.gather) where some, possibly large, input dimensions are reduced and no longer appear as part of an output shape. Here, the graph slicer 170 may select such reduce computations as cut point candidates, where the graph slicer 170 defines pieces 172A to compute suitable tensor strips, defines an execution plan to aggregate the input strips and recover the original (reduced output), and defines second pieces 172B to receive, as input, the outputs of the pieces 172A.

For example, consider output=tf.matmul(x,y), where x.shape==[20,100000], y.shape==[100000,500], and output.shape==[20,500]. The graph slicer 170 may place a cut on x.shape[1]==y.shape[0]==100000 to break the dimension into 200 strips, each of size 500. The graph slicer 170 may then construct a graph piece 172 to compute respective slices of x and y, and multiply them to reduce the intended dimension using, for example, the following example TensorFlow code:

```
@tf.function
def fun(i): #-> Returns strips of shape (20, 500).
  begin = i * 500
  end=begin+500
  return tf.matmul(x[:, begin:end], y[begin:end])
```

The graph slicer 170 may then define a corresponding execution plan to recover the original output value using the follow graph piece 172B:

output=tf.math.add_*n*([fun(*i*) for *i* in range(200)])

When, for example, a tensor t has a dimension (e.g., 1300) that is not evenly divisible by a chosen strip size (e.g., 500), the graph slicer 170 may build a first piece graph that divides the original tensor t into three slices s1=t[0:500], s2=t[500:1000], s3=t[1000:1300] having respective sizes 500, 500, and 300. The advantage is that t can be easily recovered as t=s1+s2+s3. However, because different slices have different sizes, the piece graph must support dynamic dimensions. Alternatively, the graph slicer 170 may compute all of t by building a first piece graph which computes s1=t[0:500], s2=t[500:1000], s3=t [800:1300] all of size 500 so that static shapes can be used, at the expense of the more complicated t=s1+s2+s3 [200:] necessary to recover t. Alternatively, the graph slicer 170 may compute all of t by building a first piece graph which computes s1=t[0:500], s2=t[500:1000], s3=t[1000:1500], where s3 [300:] is some extra padding with values not originally present in t. This alternative may be more efficient due to the use of static shapes, but requires careful backpropagation of the padding in addition to the slicing operation.

For each selected cut-point op and the corresponding decision to cut a specific dimension of one of its inputs, the graph slicer 170 backpropagates this cut through the rest of the compute graph 162. This means, instead of computing the large tensor 330 and slicing it at the end, the graph slicer 170 backpropagates the cut back to earlier inputs (i.e., tensors) such that having strips of those inputs is enough to compute the required tensor strip. In general, the graph slicer 170 backpropagates a cut back through a computation by translating a cut tied to an output of the computation (e.g., a TensorFlow value strip instance) to a computation to perform, usually on cuts bound to the inputs and attributes of that computation, and is implemented by overriding the corresponding computation.

In particular, the graph slicer 170 backpropagates a cut slicing along some axis of the output of a computation to slicing some input tensors 330 of that same computation. There are several modes in which a cut may be applied to the inputs of a computation which, furthermore, may include tensor inputs and attribute values. For example, the graph slicer 170 may slice data using begin:end expressions, where end=begin+size, such that data is extracted from a tensor 330 along some fixed axis. Additionally, the graph slicer 170 may update a shape, given as either a one-dimensional (1D) tensor 330 or a shape attribute value, by replacing the size of some fixed axis. Additionally, the graph slicer 170 may offset a counter for a random generator, given as a uint 64 tensor, by adding begin to the current value found at some fixed axis. However, the graph slicer 170 may not cut "no operation" (i.e., no-op) operations, where original tensors and/or attribute values are kept unchanged.

It is possible that the graph slicer 170 cannot cut a computation because all of its input values are required in full, even when only a small slice of the output is needed. Under these circumstances, the graph slicer 170 may apply a naive cut that just computes the original large tensor 330 and slices the desired strip out of it. This may thwart the desired goal of avoiding the creation of large tensors 330, but may also allow the resulting graph piece 172A, 172B to still execute when the input sizes are not too large. Alternatively, the graph slicer 170 may place cut points at such computations, and let a plan execution phase deal with the storage of large values (possibly computed in slices along an axis) and retrieval (again possibly in slices along a different axis) to be fed as input to other graph pieces 172A, 172B.

Consider, for example, a single-input, single-output function such that output=fun(input) and, moreover, the input/output share the same dimension dim=input.shape[0]==output.shape[0]. The graph slicer 170 may backpropagate a cut on the output axis 0 through the function fun( ) to the input axis 0 when fun(input)[i:j]==fun(input [i:j]) for all 0<=i<j<=dim. In other words, the slicing or cut operation commutes with the fun( ) function. This is useful because, if fun(input) returns a large output, instead of computing the entire output at once, the graph slicer 170 may alternatively cut the input into multiple smaller strips and shard the function application through the input strips in order to compute the corresponding output strips. Moreover, this notion may be generalized to: (i) allow cuts on different output axes, which may also be propagated to distinct input axes, (ii) support functions with multiple inputs, and (iii) support cases where the corresponding input/output axes may not have the exact same dimension.

The graph slicer 170, in another example, likewise backpropagates through output=tf.math.add (x,y) because tf.math.add(x, y)[i:j]==tf.math.add(x, y[i:j]). The cut arrives at y only because the corresponding dimension being cut does not exist in x and is only created through broadcasting by the add operation. Correspondingly, cuts on axis=1 on the output also backpropagate, but this time through both of the inputs, which may be expressed in TensorFlow as:

tf.math.add(*x*,*y*)[:,*i*:*j*]==tf.math.add(*x*[*i*:*j*],*y*[:,*i*:*j*])

Here, however, the cut arrives at axis=0 of x, while it remains on axis=1 of y.

The graph slicer 170, in some implementations, recursively builds a new compute graph piece 172B that takes as input relevant outputs from earlier graph pieces 172A in addition to, when the graph pieces 172A compute a strip rather than full tensor 330, the index of the strip to compute and produces as output the corresponding tensor strip.

In addition to breaking up the compute graph 162 into multiple pieces 172A, 172B, the graph slicer 170, in some examples, produces an evaluation plan indicating how each graph piece 172 should be evaluated in order to recreate the computation performed by the original graph 162. This plan may include mapping each graph piece 172A, 172B through all corresponding index values and feeding the outputs of some pieces 172 as inputs to other pieces 172.

The graph engine executor 160 also executes a graph scheduler 180. The graph scheduler 180 receives the graph pieces 172 from the graph slicer 170. For each piece 172, the graph scheduler 180 determines a computational cost of the respective pieces 172 such that they can be executed by appropriate computing resource(s). In some examples, the computation costs are determined by the graph slicer 170 during generation of the graph pieces 172 (see above) and provided to the graph scheduler 180. The computational costs represent an amount of computational resources to complete the computations. In some implementations, the computational costs of a respective piece 172 include one or more of an amount of central processing unit (CPU) resources required to execute the computational jobs of each node 164 of the respective piece 172, an amount of GPU resources required to execute the computational jobs of each node 164 of the respective piece 172, and/or an amount of memory resources required to execute the computational jobs of each node 164 of the respective piece 172. That is, the computational cost may represent a cost for executing a piece 172 and/or one or more nodes 164 of a piece 172 using CPU resources, GPU resources, memory resources and/or any combination of the three.

The graph scheduler 180 distributes the graph pieces 172 to one or more computing resources 190, 190*a-n* (e.g., physical computing device or virtual computing instances) that each compute one or more of the graph pieces 172. For example, each computing device 190 may compute a respective piece 172. Alternatively, a single computing device 190 may sequentially compute the graph pieces 172. The computing device 190 may be part of a distributed computing system (e.g., of the computing system 110). Each computing device 190 represents independent computing resources 192, 192*a-c*. That is, each computing device 190 includes separate computing resources such as respective CPU resources 192, 192*a*, GPU resources 192, 192*b*, and/or memory resources 192, 192*c*. While examples herein illustrate the computing devices 190 as independent servers, the computing devices 190 may take any form. For example, multiple computing devices 190 may be hosted within VMs on the same hardware. In other examples, some or all computing devices 190 are separate hardware located remote from each other. The computing devices 190 may be a part of the computing resources 114 and memory resources 116 of the computing system 110 and/or in communication with the computing system 110 (e.g., via the network 130).

As described in more detail below, the graph scheduler 180 distributes the graph pieces 172 to the computing devices 190 based on the computational costs of the graph pieces 172 and the computing resources 192 of the computing devices 190.

FIG. 2 depicts a non-limiting example of an example compute graph 200 expressed in TensorFlow code that will be used to illustrate certain aspects of the graph slicer 170. While the example compute graph 200 includes a made-up example for purposes of illustration, it is similar to a compute graph that may be used to perform a Monte Carlo simulation. The example compute graph 200 receives inputs, some of them with dynamic shapes, performs computations based on the inputs, and then returns a single scalar output value. The compute graph 200 illustrates how functions are often written in TensorFlow. In the illustrated example, some of the dimensions are named in comments. However, TensorFlow does not actually track the identity of these dimensions and just places the wildcard value None to indicate that the value will be known (and validated) at runtime. For example, if the first dimension of foos doesn't match that of the first dimension in bars, TensorFlow will only raise an error at run time when it needs to add the corresponding matrices and notices the dimension mismatch. Also note that to compute the output, the function needs to create some intermediate matrices (e.g., m of shape[a, c]) together with the result of the following matrix multiplication and additions, which could be prohibitively large to store if the dimension a has a very large value.

To facilitate automatic discovery of data dimensions by the graph slicer 170, symbolically named dimensions are introduced into the TensorFlow code of FIG. 2 to help the graph slicer 170 to track the identity of dimensions (either statically or dynamically) throughout the compute graph 200. The following example TensorFlow code may be added to the compute graph 200 of FIG. 2 to introduce symbolic named dimensions into the compute graph 200. In this example code, for some of the input values (e.g., bars) dimensions are enough to define their shapes. However, for others (e.g., a) their values are relevant to determine the shape and sizes of tensors 330 of the compute graph 200.

```
# Create "symbol" objects to track each dimension identity
a, b, c = symbolic.dimensions('a', 'b', 'c')
# Symbolic "values" are used to describe tensor-like objects, but may
# hold either symbolic shapes or symbolic data contents.
input__values = [
  symbolic.Value(contents=a, dtype=tf.int32, name='a'),
  symbolic.Value(shape=[b, c], dtype=tf.float64, name='foos'),
  symbolic.Value(shape=[b], dtype=tf.float64, name='bars'),
]
```

Figure 3:
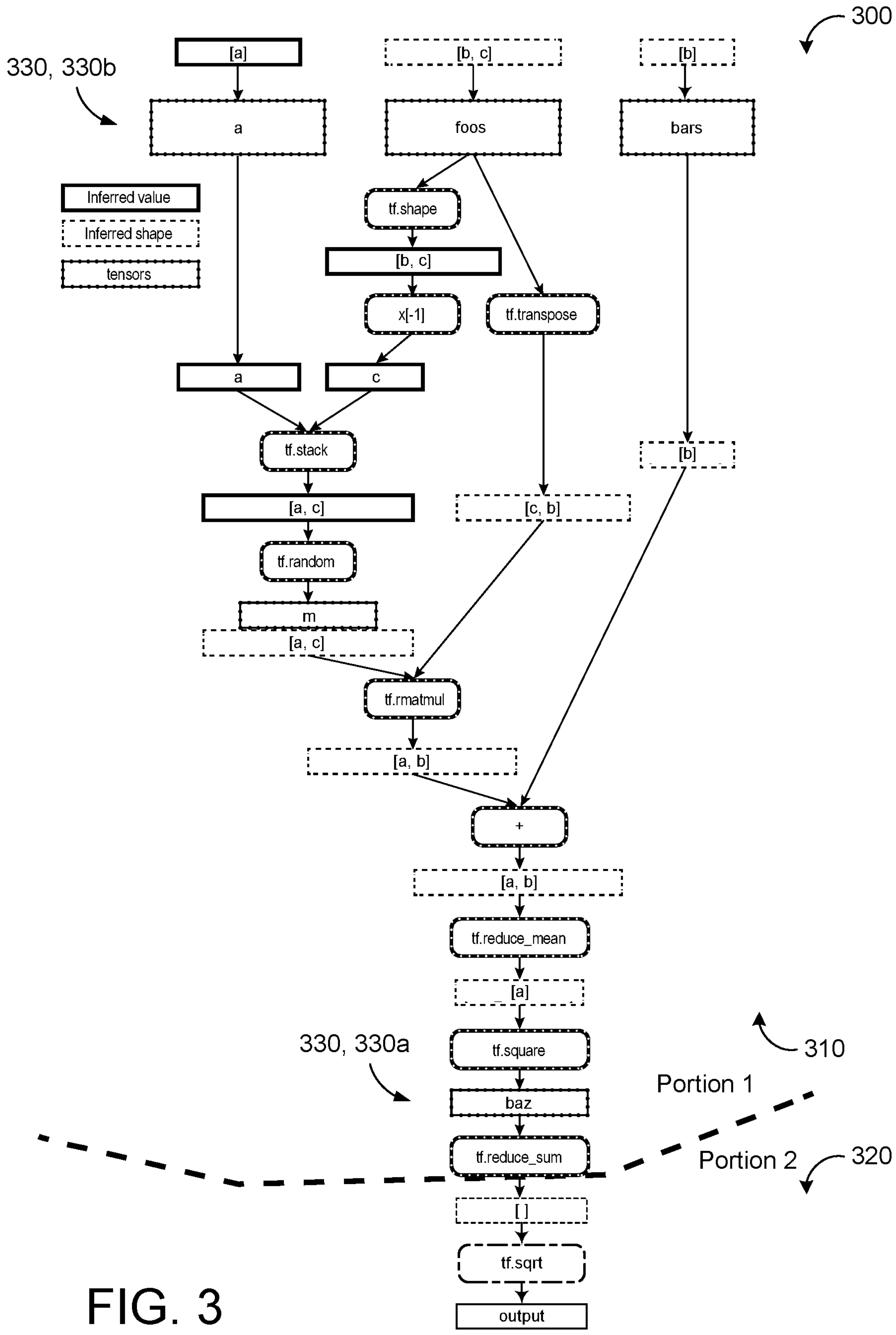
FIG. 3 is a graph that depicts the structure of, and tracks symbolic dimensions in the compute graph of FIG. 2.

FIG. 3 depicts a graph 300 of the structure of the example compute graph 200 of FIG. 2. The graph 300 represents the shape of the compute graph 200, such that the graph slicer 170 can infer the shapes and contents of input values for other tensors 330 within the compute graph 200. In the illustrated example of FIG. 3, the graph slicer 170 may infer all shapes using symbolic dimensions (i.e., shapes are tuples of the named dimensions defined by the above example code) and not using specific constant values. Once shapes are inferred, the graph slicer 170 may identify a set of dimensions to be cut. In the illustrated example, the graph slicer 170 cuts a (e.g., a second tensor 330, 300*b*) dimension on the scores tensor (e.g., a first tensor 330, 330*a*), i.e., the input to tf.reduce_sum. This, as shown, breaks up the graph 200, 300 into two separate portions: a portion 310 computing everything up to the inputs for tf.reduce_sum; and a portion 320 applying a final tf.sqrt from the aggregated outputs of portion 310.

The graph slicer 170 backpropagates this cut on the scores tensor 330*a* along its a dimension through the rest of the graph 200, 300 until original inputs are reached. For example, for baz=y^2 because the graph slicer 170 only requires some slices (e.g., baz[i:j]) to be computed. Here, not all of y needs to be computed, and it is enough to just compute y[i:j]. Following this procedure, the graph slicer 170 may backpropagate the cut through the rest of the operations of the graph 200, 300 one at a time.

Carrying out this process to its conclusion, the graph slicer 170 constructs a piece 172 to compute slices of the original large scores section without ever creating any large intermediate tensors 330. This function may receive additional begin/end or begin/size arguments to indicate the slice to compute. Alternatively, the graph slicer 170 selects a fixed size, (e.g., strip_size=500) and assign each slice an index such that the resulting fun1 would then be able to compute slices satisfying:

```
fun1(index,foos,bars)==baz[index*500:(index+1)
    *500]
```

Here, using a fixed strip size has the advantage of producing tensors 330 with static shapes which, in turn, sets an upper bound on the amount of memory required to evaluate fun1, and can take greater advantage of optimizations such as XLA compilation. Similarly, the graph slicer 170 defines a graph piece fun2 172B to aggregate those strips back and recreate the output from the original function.

FIG. 4 depicts example TensorFlow code 400 for example graph pieces fun 1 and fun2 172A, 172B. As shown, the piece/portion functions fun1 and fun2 may be straightforward because backpropagation of the cut ensures that, within each piece, it's enough to effectively replay the same sequence of computations found in the original computed graph 200, with only minimal changes.

Once these two functions are ready, the graph slicer 170 may develop an evaluation plan that specifies how evaluations of the original example function can be translated into evaluations of fun1 and fun2. For example, the output of the original compute graph 200 for a large number of dimensions (e.g., a=100,000) can be recovered by separately computing num_strips=200 of the fixed strip_size=500 using the following plan:

```
num__strips=200
strips=[tf.reduce__sum(fun1(i,foos,bars)) for i in range(num__strips)]
output=fun2(tf.stack(strips))
```

Here, for simplicity, the graph slicer 170 can select the value of a to be evenly divisible by strip_size.

Figure 5:
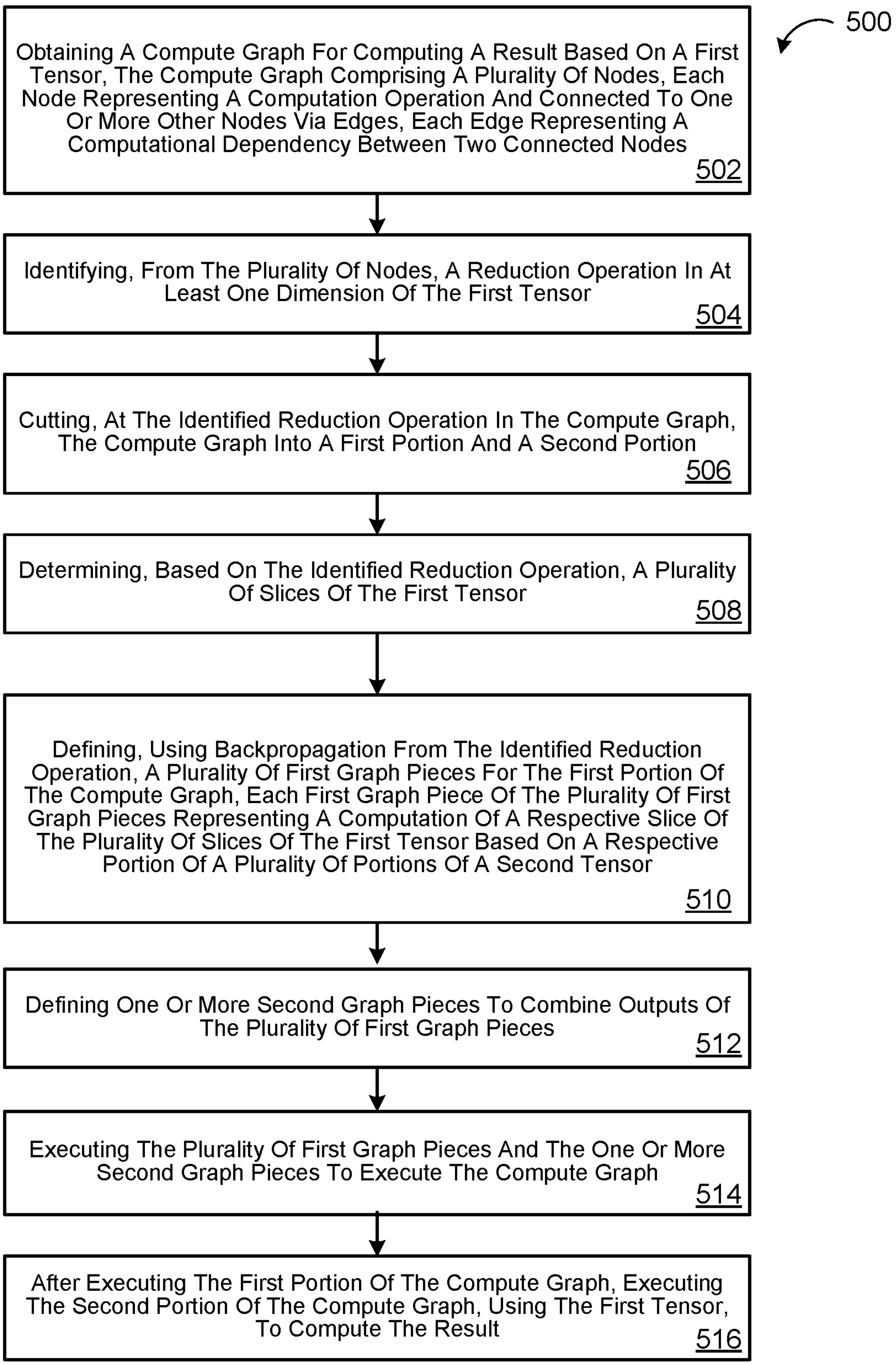
FIG. 5 is a flowchart of an example arrangement of operations for a method of performing memory management for compute graphs.

FIG. 5 is a flowchart of an exemplary arrangement of operations for a method 500 of performing memory management for compute graphs. The method 500, at operation 502, includes obtaining a compute graph 162 for computing a result 22 based on a first tensor 330, the compute graph 162 comprising a plurality of nodes 164, each node 164 representing a computation operation and connected to one or more other nodes 164 via edges 166, each edge 166 representing a computational dependency between two connected nodes 164.

The method 500 includes, at operation 504, identifying, from the plurality of nodes 164, a reduction operation in at least one dimension of the first tensor 330, at operation 506, cutting, at the identified reduction operation in the compute graph 162, the compute graph 162 into a first portion 310 and a second portion 320, and at operation 508, determining, based on the identified reduction operation, a plurality of slices of the first tensor 330.

At operation 510, the method 500 includes defining, using backpropagation from the identified reduction operation, a plurality of first graph pieces 172, 172A for the first portion 310 of the compute graph 162, each first graph piece 172 of the plurality of first graph pieces 172 representing a computation of a respective slice of the plurality of slices of the first tensor 330 based on a respective portion of a plurality of portions of a second tensor 330. At operation 512, the method 500 includes defining one or more second graph pieces 172, 172B to combine outputs of the plurality of first graph pieces 172.

The method 500, at operation 514, includes executing the plurality of first graph pieces 172A and the one or more second graph pieces 172B to execute the first portion 310 of the compute graph 162. At operation 516, the method 500 includes, after executing the first portion 310 of the compute graph 162, executing the second portion 320 of the compute graph 162, using the first tensor 330, to compute the result 22.

Figure 6:
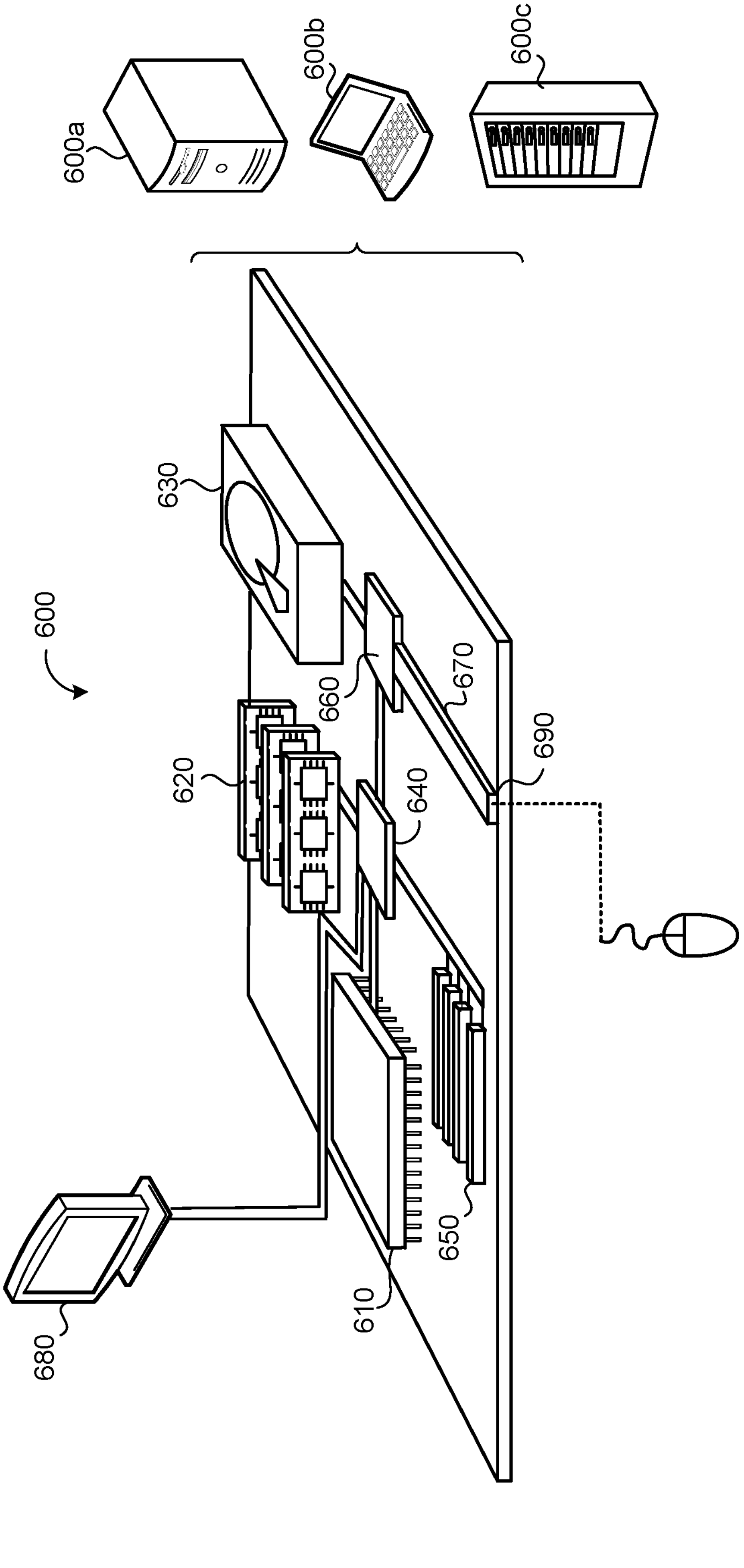
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (i.e., data processing hardware) that can be used to implement the data processing hardware 114, 126 and 192*a*, memory 620 (i.e., memory hardware) that can be used to implement the storage hardware 116, 128 and 192*c*, a storage device 630 (i.e., memory hardware) that can be used to implement the storage hardware 116, 128 and 192*c*, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. The processor 610 may refer to a computing processing unit (CPU), a graphical processing unit (GPU), a tensor processing unit (TPU) or any combination of the three. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C.

A number of implementations have been described. Nevertheless, it will be understood that various modifications may be made without departing from the spirit and scope of the disclosure. Accordingly, other implementations are within the scope of the following claims.

What is claimed is:

1. A method comprising:

obtaining, by data processing hardware, a compute graph for computing a result based on a first tensor, the compute graph comprising a plurality of nodes, each node representing a computation operation and connected to one or more other nodes via edges, each edge representing a computational dependency between two connected nodes;

identifying, by the data processing hardware and from the plurality of nodes, a reduction operation in at least one dimension of the first tensor;

cutting, by the data processing hardware and at the reduction operation in the compute graph, the compute graph into a first portion and a second portion;

determining, by the data processing hardware and based on the reduction operation, a plurality of slices of the first tensor;

defining, by the data processing hardware, a plurality of first graph pieces for the first portion of the compute graph by at least propagating a cut backward from the reduction operation to inputs of preceding operations, each first graph piece of the plurality of first graph pieces representing a computation of a respective slice of the plurality of slices of the first tensor based on a respective portion of a plurality of portions of a second tensor;

defining, by the data processing hardware, one or more second graph pieces to combine outputs of the plurality of first graph pieces;

executing, by the data processing hardware, the plurality of first graph pieces and the one or more second graph pieces to compute the first tensor; and after executing the first portion of the compute graph, executing, by the data processing hardware, the second portion of the compute graph, using the first tensor, to compute the result.

2. The method of claim 1, wherein the plurality of first graph pieces and the one or more second graph pieces, when executed by a computing resource, require an amount of memory that does not exceed an amount of memory available to the computing resource.

3. The method of claim 2, wherein the compute graph, when executed by the computing resource prior to cutting the compute graph, requires an amount of memory that exceeds the amount of memory available to the computing resource.

4. The method of claim 1, wherein executing, using a computing resource, the plurality of first graph pieces and the one or more second graph pieces uses less memory relative to executing, using the computing resource, the compute graph-prior.

5. The method of claim 1, further comprising tracking, by the data processing hardware, a size of the first tensor based on one or more symbolically named dimensions.

6. The method of claim 5, further comprising determining, by the data processing hardware, an upper bound for the size of the first tensor based on upper bounds for the symbolically named dimensions.

7. The method of claim 5, further comprising identifying, by the data processing hardware, the reduction operation based on the size of the first tensor and an amount of memory available in a computing process instance.

8. The method of claim 1, wherein one or more of the plurality of first graph pieces are executed in serial.

9. The method of claim 1, wherein two or more of the plurality of first graph pieces are executed in parallel.

10. The method of claim 1, wherein two or more of the plurality of first graph pieces are executed on virtual computing resources.

11. A system comprising:

data processing hardware; and memory hardware in communication with the data processing hardware, the memory hardware storing instructions that, when executed on the data processing hardware, cause the data processing hardware to:

obtain a compute graph for computing a result based on a first tensor, the compute graph comprising a plurality of nodes, each node representing a computation operation and connected to one or more other nodes via edges, each edge representing a computational dependency between two connected nodes;

identify, from the plurality of nodes, a reduction operation in at least one dimension of the first tensor;

cut, at the reduction operation in the compute graph, the compute graph into a first portion and a second portion;

determine, based on the reduction operation, a plurality of slices of the first tensor;

define a plurality of first graph pieces for the first portion of the compute graph by at least propagating a cut backward from the reduction operation to inputs of preceding operations, each first graph piece of the plurality of first graph pieces representing a computation of a respective slice of the plurality of slices of the first tensor based on a particular portion of a plurality of portions of a second tensor;

define one or more second graph pieces to combine outputs of the plurality of first graph pieces;

execute the plurality of first graph pieces and the one or more second graph pieces to compute the first tensor; and after executing the first portion of the compute graph, execute the second portion of the compute graph, using the first tensor, to compute the result.

12. The system of claim 11, wherein the plurality of first graph pieces and the one or more second graph pieces, when executed by a computing resource, require an amount of memory that does not exceed an amount of memory available to the computing resource.

13. The system of claim 12, wherein the compute graph, when executed by the computing resource prior to cutting the compute graph, requires an amount of memory that exceeds the amount of memory available to the computing resource.

14. The system of claim 11, wherein, to execute, the plurality of first graph pieces and the one or more second graph pieces, the data processing hardware uses less memory relative to executing the compute graph.

15. The system of claim 11, wherein the instructions further cause the data processing hardware to track a size of the first tensor based on one or more symbolically named dimensions.

16. The system of claim 15, wherein the instructions further cause the data processing hardware to determine an upper bound for the size of the first tensor based on upper bounds for the symbolically named dimensions.

17. The system of claim 15, wherein the instructions further cause the data processing hardware to identify the reduction operation based on the size of the first tensor and an amount of memory available in a computing process instance.

18. The system of claim 11, wherein one or more of the plurality of first graph pieces are executed in serial.

19. The system of claim 11, wherein two or more of the plurality of first graph pieces are executed in parallel.

20. The system of claim 11, wherein two or more of the plurality of first graph pieces are executed on virtual computing resources.

* * * * *